FIG. II
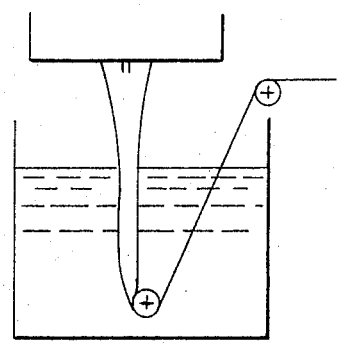
a
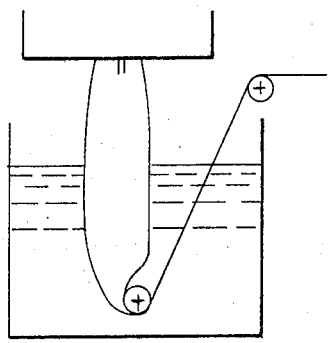
b
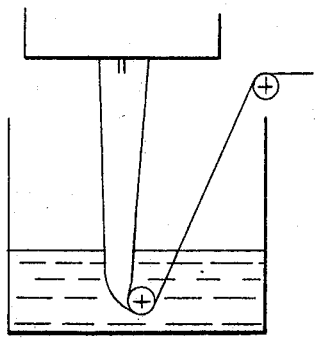
d
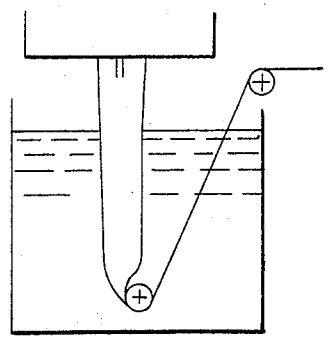
e

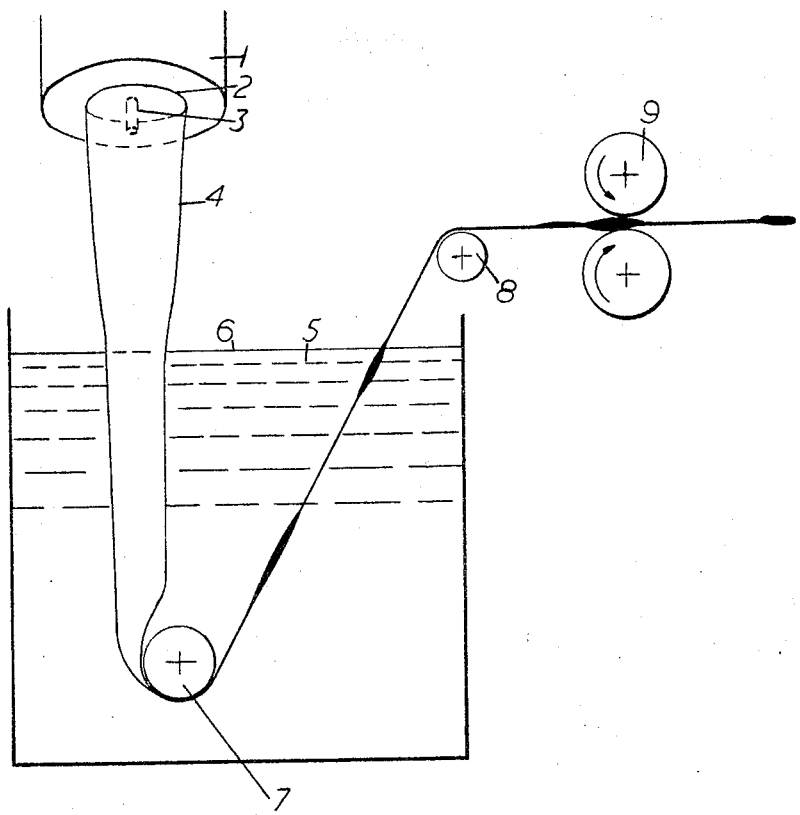
FIG. I
INVENTOR
Walter Settele
Cushman, Darby & Cushman
ATTORNEYS

Aug. 2, 1966  W. SETTELE  3,264,384
PROCESS FOR PRODUCING A SYNTHETIC BAST
Filed March 26, 1962  3 Sheets-Sheet 3
FIG. III
FIG. IV
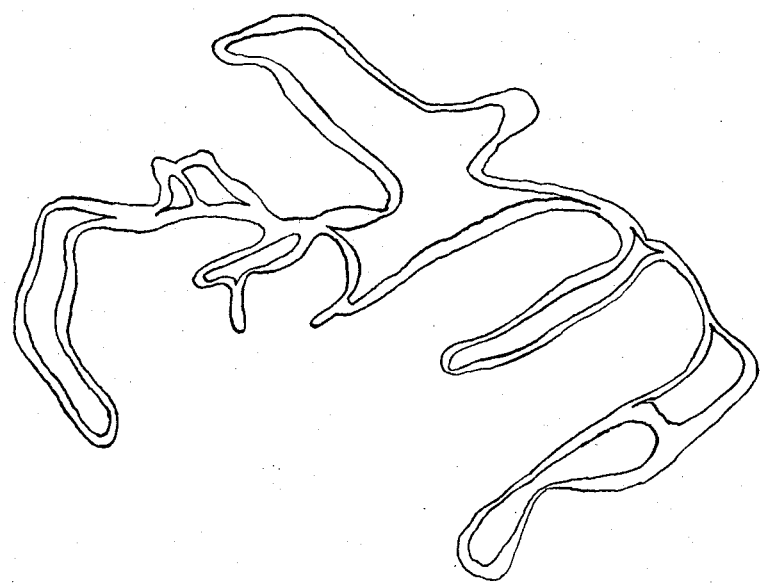
INVENTOR
Walter Settele
BY
Cushman, Darby & Cushman
ATTORNEYS

United States Patent Office 3,264,384
Patented August 2, 1966

3,264,384
PROCESS FOR PRODUCING A SYNTHETIC BAST
Walter Settele, Lucerne, Switzerland, assignor to Societe de la Viscose Suisse, Emmenbrucke, Switzerland, a Swiss body corporate
Filed Mar. 26, 1962, Ser. No. 182,283
Claims priority, application Great Britain, Apr. 5, 1961, 12,279/61
5 Claims. (Cl. 264—95)

The present invention relates to the production of synthetic bast-like materials.

In application Serial No. 811,675, filed May 7, 1959, and now Patent No. 3,061,401 dated October 30, 1962, which is assigned to the same assignee as the present application, there is described a process for the production of a synthetic material having the appearance of a bast fibre, comprising extruding a molten synthetic fibre-forming polymer through an annular orifice to form a tubular filament and maintaining with inert gas a slight superatmospheric and pulsating pressure inside the tubular filament, passing the filament while in the plastic state into a cooling liquid and then, while still in an agglutinative state, drawing it past a deflector placed in the cooling liquid asymmetrically to the tubular filament so that it is flattened and irregularly creased and folded and the opposite sides are at least partly agglutinated.

The present invention provides a process by which products of even greater resemblance to natural bast can be obtained; more particularly it makes it possible to obtain products which, besides displaying irregular creases and folds and having an interior wall which is partially cemented together, are folded and have at irregular intervals a varying titre and a varying width.

According to the invention a process for the production of a synthetic bast-like material consisting of a flat, irregularly folded and at least partly agglutinated tubular filament of irregularly varying titre and width, comprises extruding a molten linear high polymeric thermoplastic material through an annular orifice to form a tubular filament, maintaining a slight superatmospheric pressure of inert gas inside the tubular filament, imposing an irregular variation on the volume of gas inside the tubular filament by means located outside said filament thereby to vary irregularly the width and denier of the said filament, passing the tubular filament while it is still not completely hardened downwards through a cooling liquid and then, while the said filament is still in an agglutinative state, round a deflector, immersed in the cooling liquid and in contact with one side only of the said filament, thereby to flatten asymmetrically the tubular filament and impart thereto irregular creases and folds, and finally withdrawing said flattened filament under tension.

The invention comprises also the bast-like material made in this way, which consists of a flat irregularly folded thin-walled tubular filament of irregularly varying width and titre made from a linear high polymeric thermoplastic material especially a polyamide or polyester, the walls of the said tubular filament being at least partly agglutinated and having permanent irregular creases and folds.

The hollow filament is extruded through an annular spinneret, preferably downwardly. This spinneret may form part of any desired kind of apparatus conventionally used for melting and extruding thermoplastic materials, being, for example, a screw press or a melt-spinning apparatus, such, for example, as has been described in Swiss patent specification No. 211,636.

Within the hollow filament a slight superatmospheric pressure is maintained by means of an inert gas so as to prevent the tube collapsing. The wall thickness of the filament may be increased or diminished at irregular intervals by varying aperiodically the pressure of the gas injected into the tubular material with the aid of a pressure regulating means disposed externally in relation to the spinning apparatus.

When the pressure is increased, the diameter of the tube is locally increased and at the same time the wall thickness is reduced.

In the process disclosed in the aforesaid application No. 811,675 the only pressure pulses generated in the gas trapped within the tubular filament result from the construction of the filament by the deflecting means and the cooling in the cooling bath, whereby the filament is irregularly folded and creased. By the process of the present invention irregular titre variations are produced in the filament with the aid of externally controlled aperiodic pressure variations.

After issuing from the spinneret, the hollow filament is conveyed first through a cooling gas and then through a liquid coolant. The tubular filament, which is still very plastic, undergoes distortion owing to the draw-off tension. It tapers off conically in the direction of its travel until it enters the liquid coolant where its diameter is fixed by cooling. This phenomenon also may be utilised by aperiodically varying the coolant level—that is to say the distance from the spinneret to the level of the liquid coolant—with the aid of a level varying device, so causing irregular variations in the titre and width of the filament.

The filament is then conveyed over a mechanical deflector. This can, for example, consist of a rigidly mounted rod by means of which the filament is deflected from its initial travelling direction and thus is squeezed, folded and creased and at the same time its interior wall is partially stuck together.

The cooled and flattened tubular filament is drawn off by a driven means, preferably a pair of rolls, under suitable tension.

The filament thus obtained is initially stretched as a result of the draw-off tension, but it can still be oriented and further stretched by known means, for example by means of two pairs of rollers, the supply rollers revolving at a lower circumferential velocity than the withdrawal rollers. The increase in length as a result of the stretching is accompanied by a decrease in width of the irregularly folded tubular filament.

If desired, the stretching operation may be performed subsequently as a second stage of the process but it is, however, preferably continuous with the spinning before the filament is wound up.

The resulting filament is a bast-like structure having a width which varies aperiodically with respect to both magnitude and distance with an aperiodically varying titre and with irregular permanent folds and creases. Consequently, the filament imparts to braided, woven or knitted fabrics made therefrom a pleasing, bast-like aspect.

The product and the process of the present invention are described in greater detail with reference to the accompanying drawings in which:

FIGURE I is a diagrammatic side view of a form of apparatus in which the novel synthetic bast can be made;

FIGURE II shows diagrammatically the variations in the dimensions of the tubular filament caused by the variations in the pressure of gas in the filament and in the distance between the spinneret and the surface of the coolant; and FIGURES III and IV show respectively a plan view and a cross-section of a tubular filament obtained by the present invention.

In FIGURE I, 2 designates the annular slot of a spinneret 1 attached to a melt-spinning apparatus (not shown). An inlet orifice 3 disposed in the centre of the spinneret 1 admits an inert gas to the central tubular cavity of the filament 4 formed thereby. The gas pressure can be increased or reduced aperiodically by means of a pressure-regulating device (not shown). The filament 4 is introduced into a liquid coolant 5 the level of which can be aperiodically varied by any suitable device (not shown). Within the liquid coolant 5 the hollow filament 4 passes underneath a fixed rod 7 which serves as a deflecting means, whereby the filament is deflected and at the same time squeezed together and folded as a result of the draw-off tension. The constricted hollow filament is then passed out of the liquid coolant, over a further rod 8, and either fed into a stretching device by a driven draw-off means 9 consisting of two rolls (not shown) or reeled as it is.

FIGURE II shows the aperiodic variation of the diameter of the tubular filament, and of the titre and the width of the tubular filament, where (a) and (b) represent the variation of the diameter of the hollow filament at a low and high gas pressure respectively, the level of the coolant being kept constant, and (d) and (e) show the effect of a varying coolant level on the diameter of the tubular filament at a constant gas pressure within the tube, the former at a long distance between the coolant level and the spinneret and the latter when this distance is short.

FIGURE III is a plan view of a section of the synthetic bast of the invention, showing the width irregularly varying in magnitude along the length of the filament.

FIGURE IV is a cross-sectional view through the synthetic bast of the invention.

The following examples illustrate the invention.

*Example I*

From a melt-spinning apparatus, polyhexamethylene adipamide is supplied to an apparatus arranged as shown in FIGURE I. The spinneret has an external annular slot of diameter 10 mm. and 0.13 mm. wide. Nitrogen is injected through the centre of the spinneret into the central cavity of the filament as it is extruded. The tubular filament first travels through a zone of cooling air 3 cm. long and then enters a cooling bath filled with water heated to 45° C. The pressure under which the nitrogen is injected is aperiodically varied with a regulating device outside the spinning apparatus in a manner such that within the tube a zone of a super-atmospheric pressure increasing from 2 to 6 mm. water head alternates with a zone of a pressure decreasing from 6 mm. to 2 mm.

Inside the cooling bath the tube is deflected by means of a fixed round rod of diameter 0.8 cm., and it is then drawn off outside the bath over an identical deflecting rod by means of a driven pair of rolls revolving at a peripheral speed of 53 metres per minute. The filament is then stretched to 320% of its original length and reeled. The titre is adjusted to an average of 1900 denier. The aperiodic variations in the titre of the hollow filament produced by the varying pressure of the injected nitrogen range from 1800 denier to 2200 denier, and the width of the filament varies from 2.5 to 4. These extreme values are distributed irregularly over a filament length of 3 to 5 m.

The dry strength is 2.5 grams per denier, the ultimate stretch is 43%, and the wet strength is 81% of the dry strength.

*Example II*

On the apparatus used in Example I, a tubular filament of polyhexamethylene adipamide is extruded into a current of cooling air through a spinneret having an annular slot of an external diameter of 17 mm. and a width of 0.1 mm. Within the tubular filament a super-atmospheric pressure of 4 mm. water head is constantly maintained with the aid of nitrogen injected through the centre of the spinneret.

The tubular filament formed is then conveyed into a container which is disposed underneath the spinneret and filled with water heated at 35° C. The distance between the level of the water and the spinneret is aperiodically varied by means of an elastic displacement device which is in communication with the water bath in a manner such that an increase in the distance from 2 to 8 cm. alternates with a decrease of from 8 to 2 cm. By means of the round rod disposed within the water bath the tube is irregularly folded, deflected and drawn off by a driven pair of rolls at the rate of 53 m. per minute. The filament is then stretched to 300% of its original length and reeled.

The aperiodic variation of the distance between the spinneret and the level of the water bath produces in the hollow filament variations in its titre ranging from 800 to 1200 denier, the average titre being 950 denier. The width of the folded filament is 3.1 mm. ±1.1 mm. The maxima occur aperiodically over a filament length of 2 to 4.5 m. The tensile strength of the filament in the dry state is 3.4 grams per denier and the ultimate stretch is 32%.

*Example III*

A tubular filament of polyethylene terephthalate is produced in the apparatus used in Example I and conveyed into a container which is disposed underneath the spinneret and filled with water at 20° C. The distance between the water level and the spinneret is aperiodically varied by means of a regulating device disposed on the water container in a manner such that a decrease from 6 to 3 cm. alternates with an increase from 3 to 6 cm. Inside the extruded tubular filament there is a moderate super-atmospheric pressure of nitrogen which is varied aperiodically by means of a regulating device outside the spinning apparatus in a manner such that a decrease from 4 to 2 mm. waterhead alternates with an increase from 2 to 4 mm. By means of a round rod the tubular filament is folded, and deflected, and is drawn off round a deflecting means, by a driven pair of rolls at a rate of 48 m. per minute, immediately thereafter stretched to 290% of its original length, and reeled.

The average titre of the hollow filament formed is 1350 denier. The extreme titres resulting from the aperiodic variation of the nitrogen pressure and of the water bath level are 1120 denier and 1530 denier following one upon the other over a filament length of 1.3 to 3.1 m. The filament has a tensile strength of 3.0 to 3.6 gram/denier with an ultimate stretch of 30 and 39% respectively.

I claim:

1. In a process for the production of a synthetic material having the appearance of a bast fibre including the steps of extruding a molten synthetic fibre-forming polymer through an annular orifice to form a tubular filament, maintaining a slight superatmospheric and pulsating pressure with inert gas inside the tubular filament, passing the filament while in the plastic state into a cooling liquid and then, while still in an agglutinative state, drawing it past a deflector placed in the cooling liquid asymmetrically to the tubular filament so that it is flattened and irregularly creased and folded and the opposite sides are at least partly agglutinated, the improvement which comprises the further step of irregularly varying the distance between the surface of the cooling liquid and the annular orifice to irregularly vary the volume of said inert gas within the filament and thereby irregularly vary the width and denier of the filament such that the flattened filament will also have a varying titre and varying width at irregular intervals, and finally withdrawing the flattened filament under tension.

2. Process according to claim 1 in which the product is subsequently stretched.

3. In a process for the production of a synthetic material having the appearance of a bast fibre including the steps of extruding a molten synthetic fibre-forming polymer through an annular orifice to form a tubular filament, maintaining a slight superatmospheric and pulsating pressure with inert gas inside the tubular filament, passing the filament while in the plastic state into a cooling liquid and then, while still in an agglutinative state, drawing it past a deflector placed in the cooling liquid asymmetrically to the tubular filament so that it is flattened and irregularly creased and folded and the opposite sides are at least partly agglutinated, the improvement which comprises the further steps of irregularly varying the pressure of said inert gas within the filament, irregularly varying the distance between the surface of the cooling liquid and the annular orifice to irregularly vary the volume of said inert gas within the filament, and thereby irregularly vary the width and denier of the filament such that the flattened filament will also have a varying titre and varying width at irregular intervals, and finally withdrawing the flattened filament under tension.

4. Process according to claim 3 in which the product is subsequently stretched.

5. The process of claim 3 wherein the synthetic fibre-forming material is a linear high polymer thermoplastic material selected from the class consisting of polyesters and polyamides.

References Cited by the Examiner

UNITED STATES PATENTS

| | | | |
|---|---|---|---|
| 2,940,126 | 6/1960 | Sheridan | 264—167 |
| 3,012,276 | 12/1961 | Given | 264—209 |
| 3,061,401 | 10/1962 | Studer et al. | |

ALEXANDER H. BRODMERKEL, *Primary Examiner.*

MORRIS LIEBMAN, ALFRED L. LEAVITT,
*Examiners.*

C. B. HAMBURG, K. W. VERNON, B. SNYDER,
*Assistant Examiners.*